R. S. CORLETT.
COIN CONTROLLED TOWEL SERVICE APPARATUS.
APPLICATION FILED MAR. 5, 1912.
1,222,533.
Patented Apr. 10, 1917.
8 SHEETS—SHEET 1.
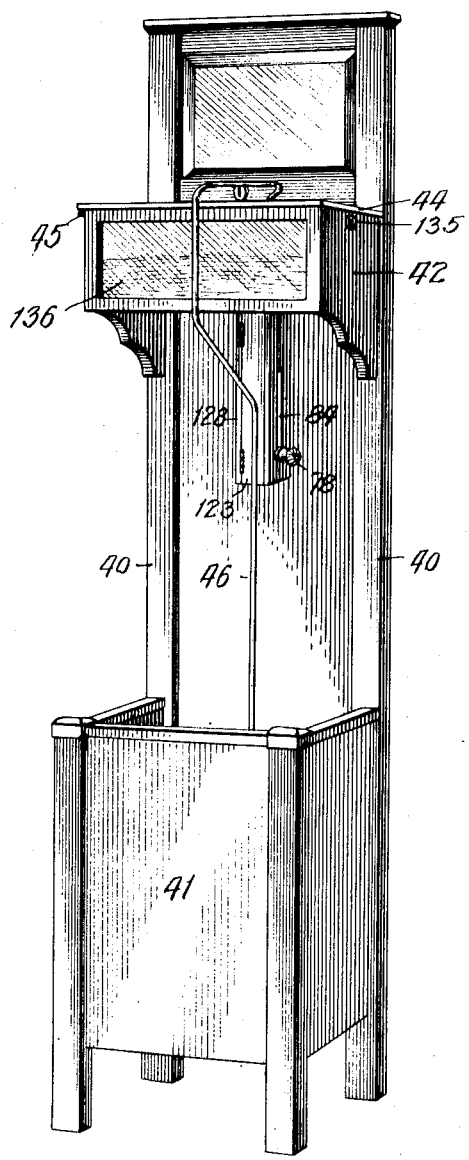
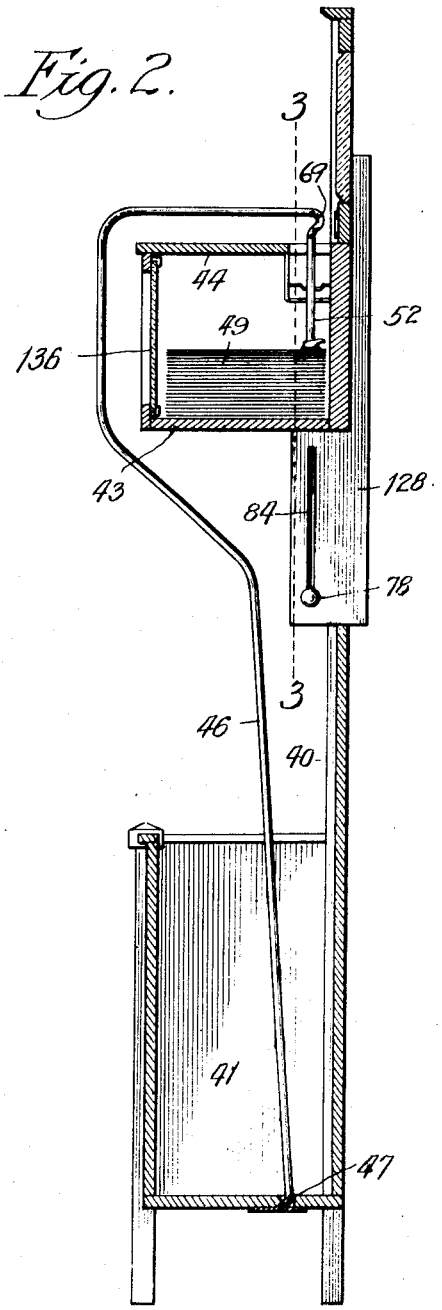
Witnesses:
John Enders
Henry A. Parks
Inventor:
Robert S. Corlett,
by Sheridan, Wilkinson, Scott & Richmond
Attys R. S. CORLETT.
COIN CONTROLLED TOWEL SERVICE APPARATUS.
APPLICATION FILED MAR. 5, 1912.
1,222,533.
Patented Apr. 10, 1917.
8 SHEETS—SHEET 2.
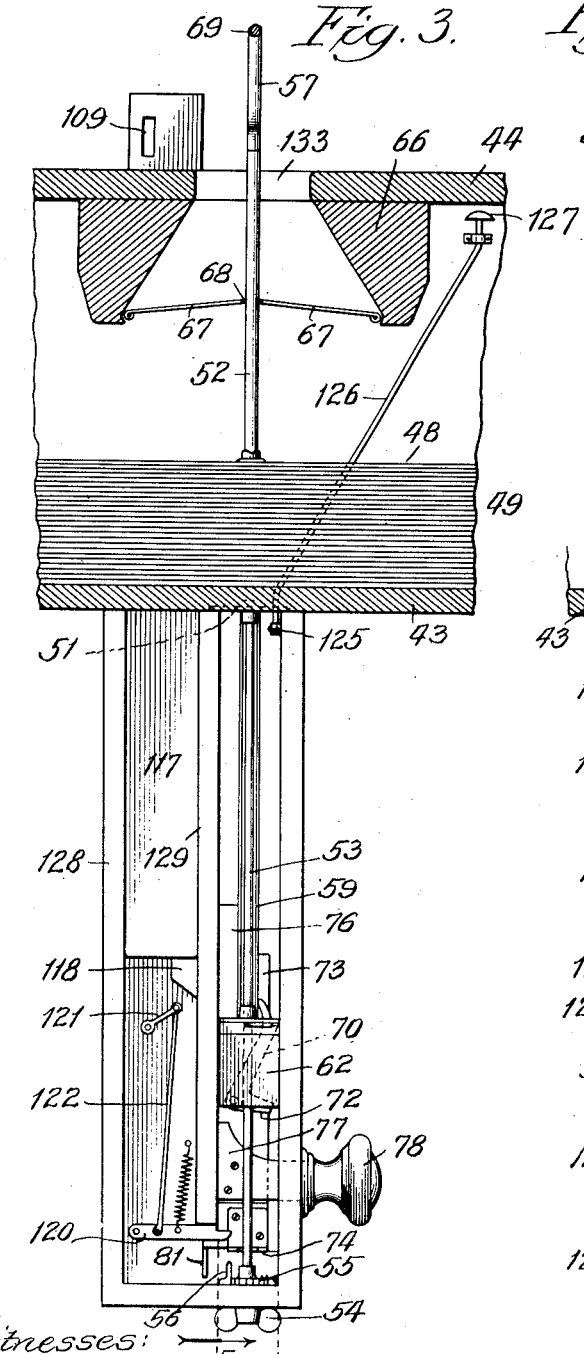
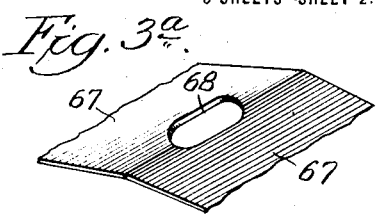
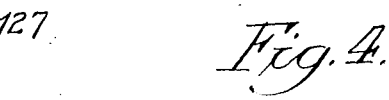
Witnesses:
John Enders
Henry A Parke
Inventor:
Robert S. Corlett,
by Sheridan, Wilkinson, Scott & Richmond
Attys

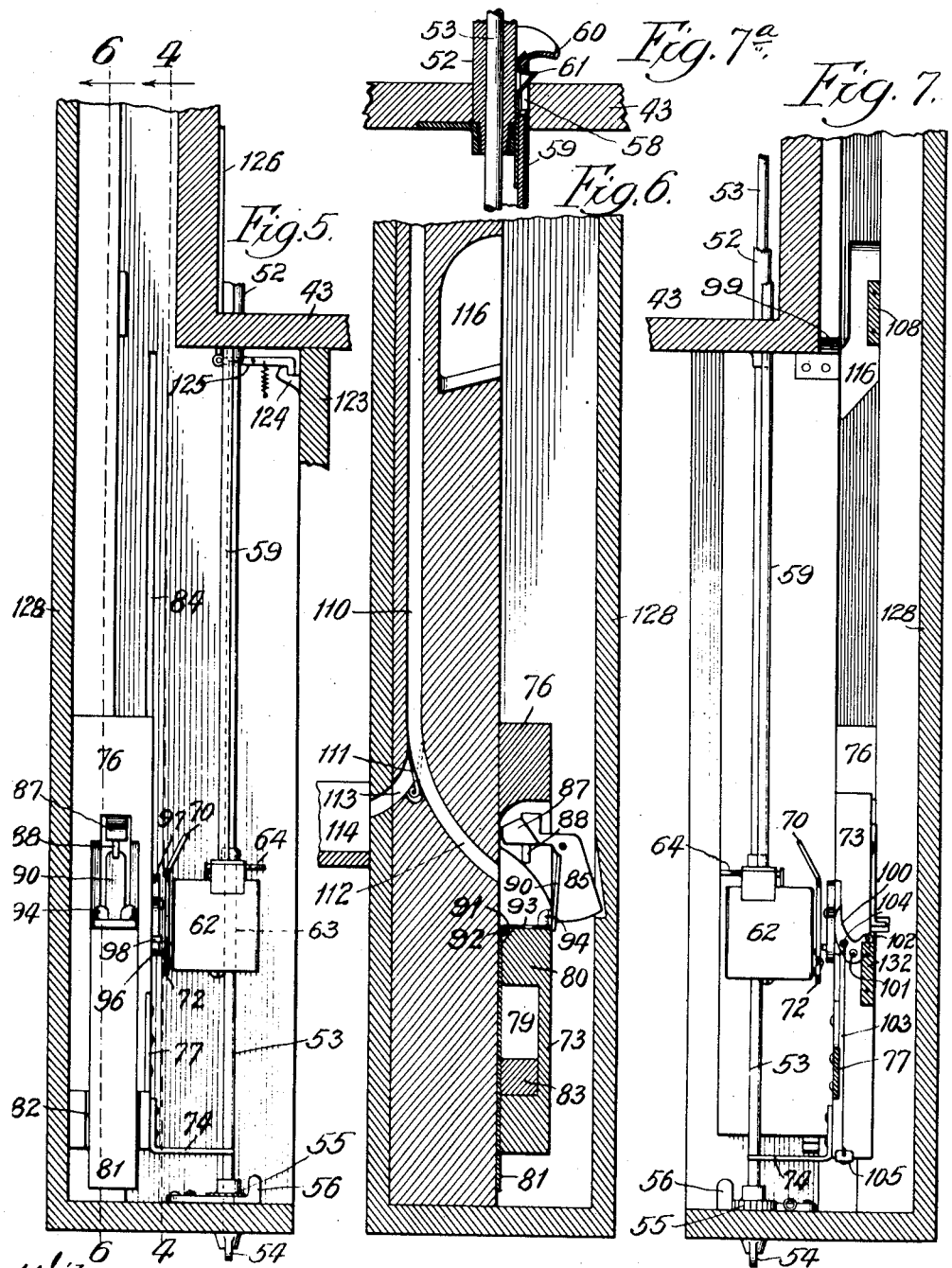

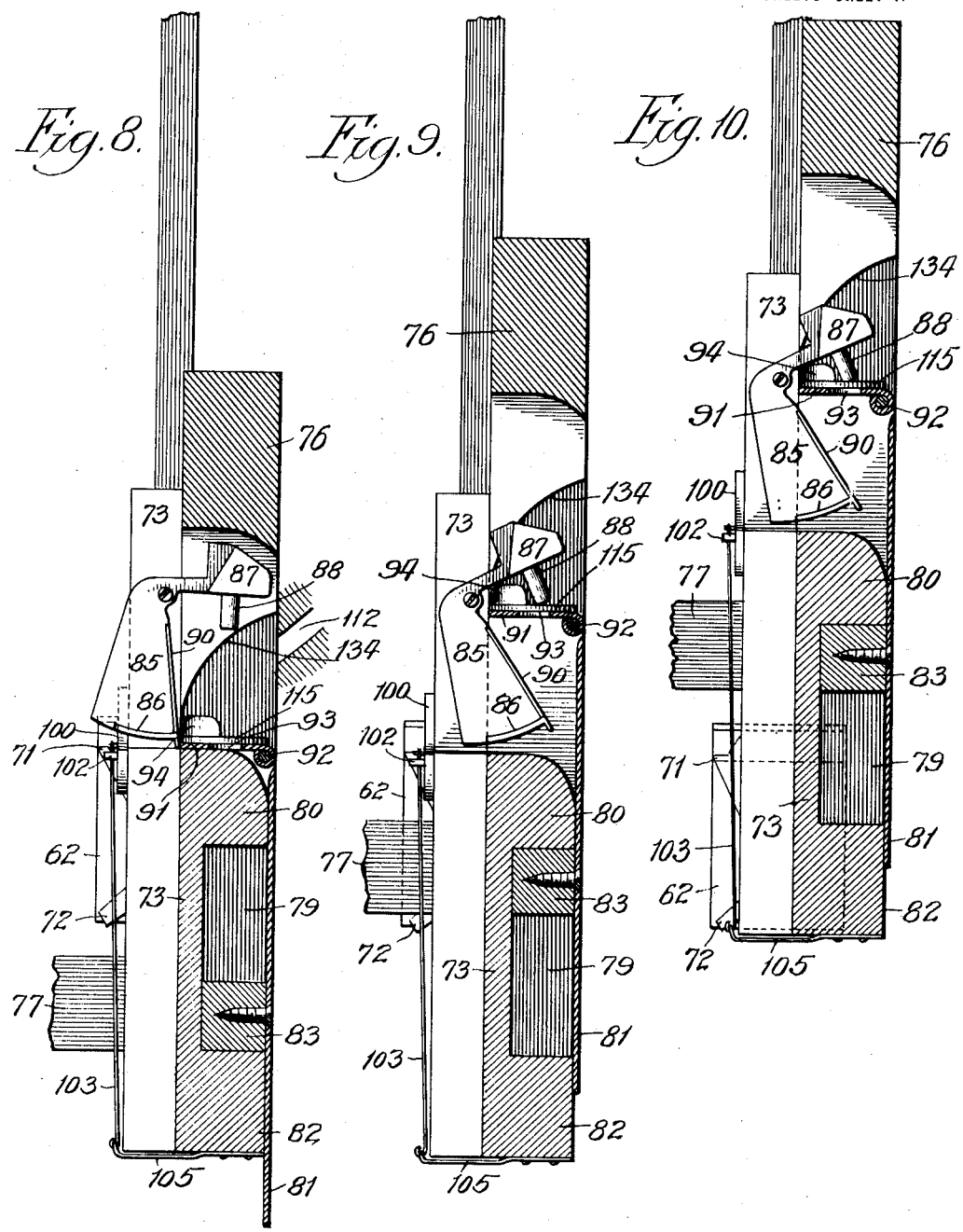

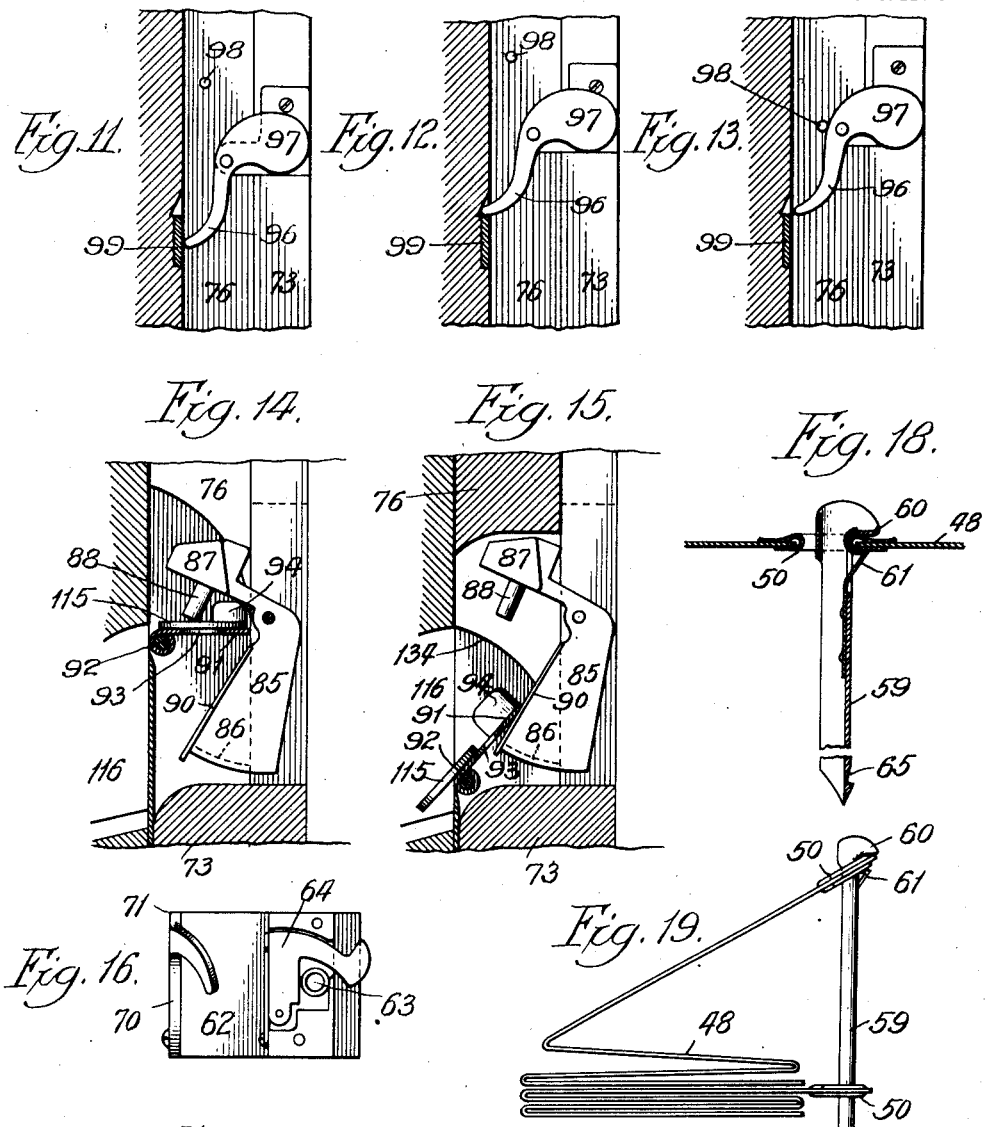

R. S. CORLETT.
COIN CONTROLLED TOWEL SERVICE APPARATUS.
APPLICATION FILED MAR. 5, 1912.
1,222,533.
Patented Apr. 10, 1917.
8 SHEETS—SHEET 6.
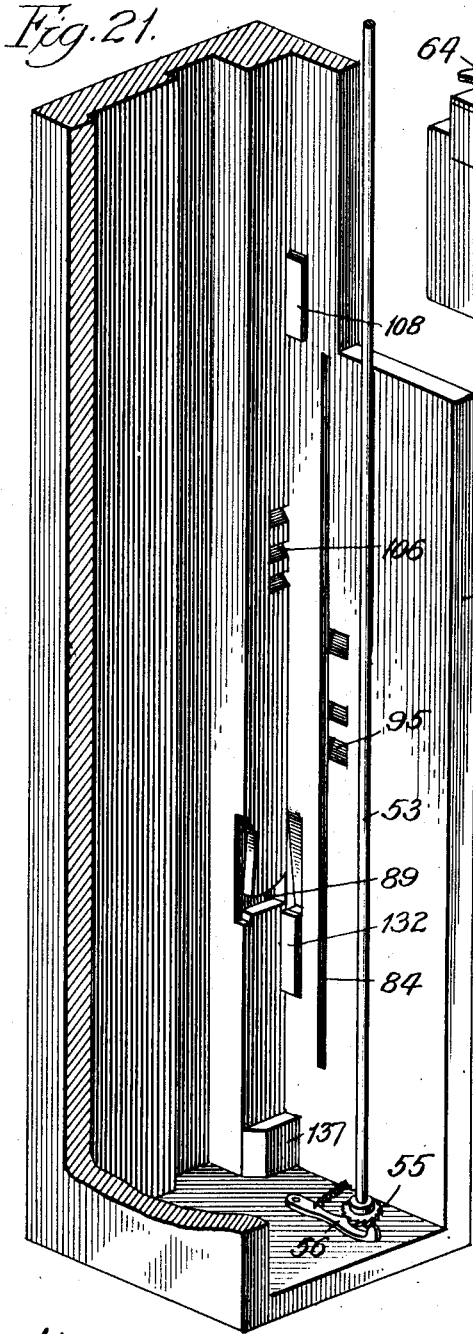
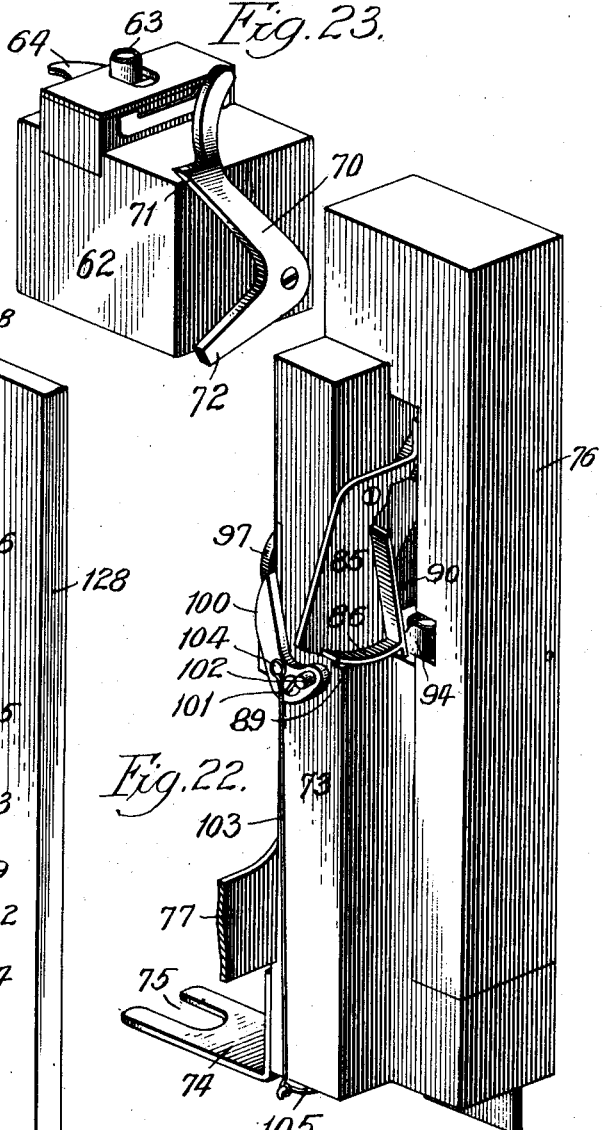

R. S. CORLETT.
COIN CONTROLLED TOWEL SERVICE APPARATUS.
APPLICATION FILED MAR. 5, 1912.
1,222,533.
Patented Apr. 10, 1917.
8 SHEETS—SHEET 7.
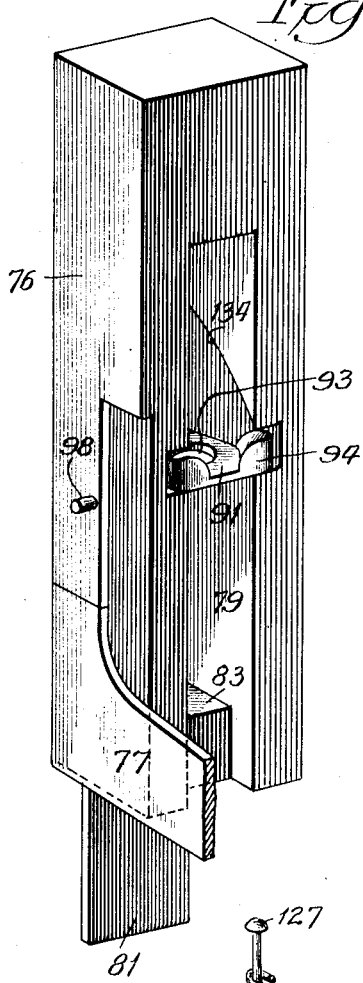
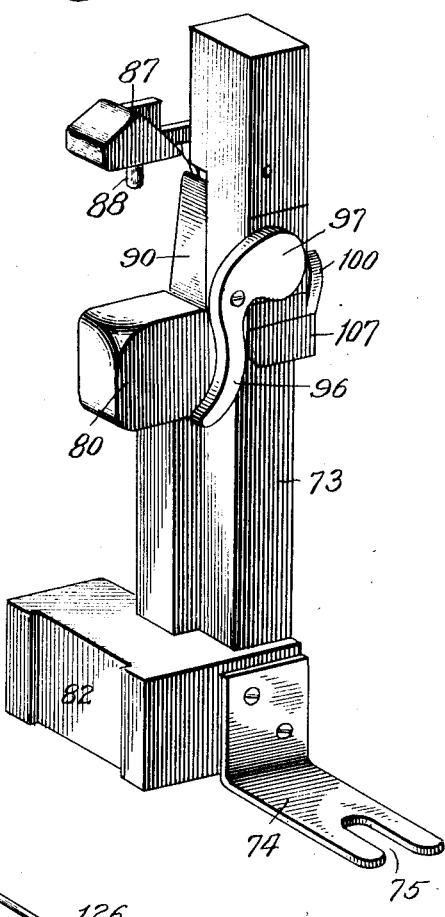
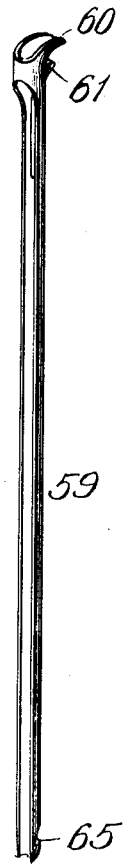
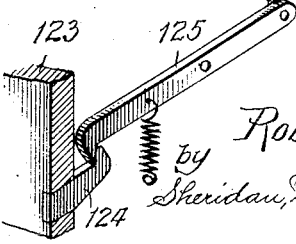
Witnesses:
John Enders
Henry A Parks
Inventor:
Robert S. Corlett,
by Sheridan, Wilkinson, Scott & Richmond,
Attys R. S. CORLETT.
COIN CONTROLLED TOWEL SERVICE APPARATUS.
APPLICATION FILED MAR. 5, 1912.
1,222,533.
Patented Apr. 10, 1917.
8 SHEETS—SHEET 8.
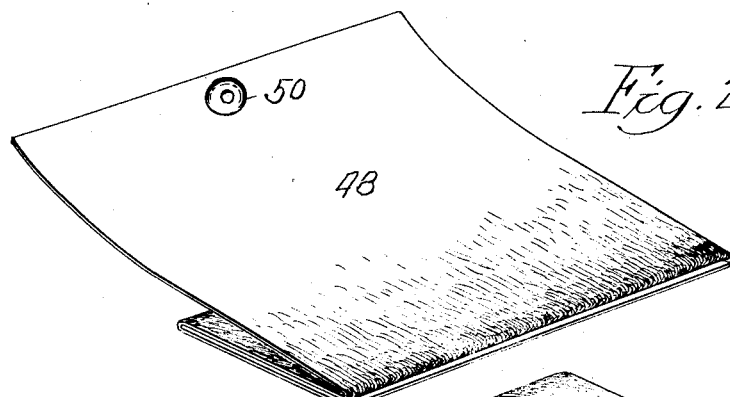
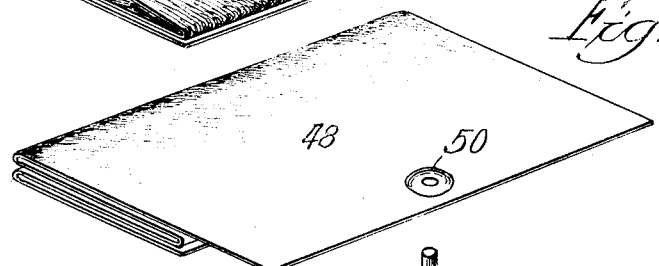
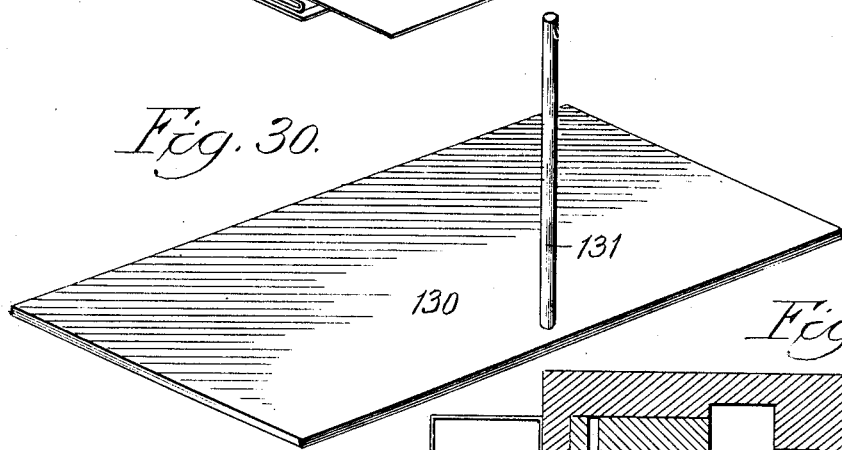
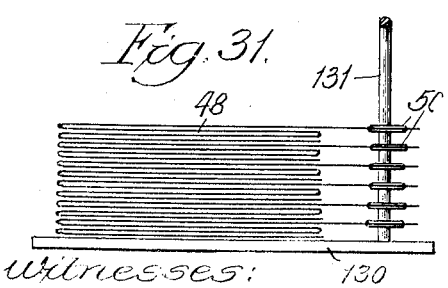
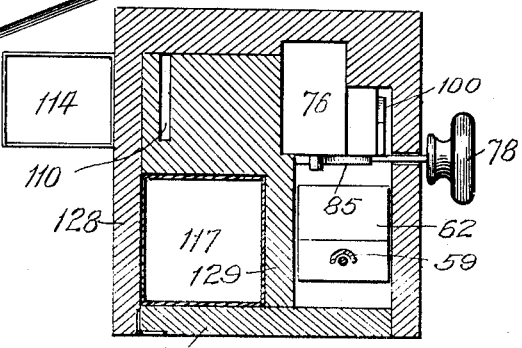
Witnesses:
John Enders
Henry A. Parks
Inventor:
Robert S. Corlett,
by Sheridan, Wilkinson, Scott & Richmond
Attys.

UNITED STATES PATENT OFFICE.

ROBERT S. CORLETT, OF EVANSTON, ILLINOIS, ASSIGNOR TO JACQUES ROUSSO, OF CHICAGO, ILLINOIS.

COIN-CONTROLLED TOWEL-SERVICE APPARATUS.

1,222,533. Specification of Letters Patent. Patented Apr. 10, 1917.

Application filed March 5, 1912. Serial No. 681,786.

*To all whom it may concern:*

Be it known that I, ROBERT S. CORLETT, a citizen of the United States, residing at Evanston, in the county of Cook and State of Illinois, have invented certain new and useful Improvements in Coin-Controlled Towel-Service Apparatus, of which the following is a specification.

The principal object of my invention is to provide a new and improved coin controlled device for dealing individual towels to respective users. Another object of my invention is to provide a device containing a set of clean towels, one of which may be accessible for use by means of coin controlled apparatus, although the towel is all the time retained by the apparatus. All these objects and various others in connection therewith will be made apparent in the following specification and claims, taken with the accompanying drawings.

In these drawings I have illustrated in detail one specific embodiment of my invention and I now proceed to describe the same and its mode of operation. My invention is defined in the appended claims.

Referring to the drawings—

Figure 1 is a general perspective view of my device.

Fig. 2 is a vertical section of the same.

Fig. 3 is a transverse fragmental vertical section, taken on the line 3—3 of Fig. 2.

Fig. 3ª is a fragmental perspective view of a pair of shutters showing alining notches therein.

Fig. 4 is a similar section taken a little farther back, that is, on the line 4—4 of Fig. 5.

Fig. 5 is a vertical section on the line 5 of Fig. 3.

Fig. 6 is a similar vertical section on an enlarged scale taken still farther back, that is, on the line 6—6 of Fig. 5.

Fig. 7 is a vertical section on the line 7 of Fig. 3.

Fig. 7ª is a fragmental vertical detail section of a portion of the needle which engages the towels, showing the needle in its lowermost position.

Figs. 8, 9 and 10 are vertical sections on approximately the same plane as Fig. 6, but looking in the opposite direction and showing certain parts in different successive relative positions.

Figs. 11, 12 and 13 are successive views of a dog in different relative positions.

Figs. 14 and 15 are views of the coin discharging apparatus in successive positions.

Figs. 16 and 17 are top plan views of a detail in different relations.

Fig. 18 is a vertical section of the needle which engages the towels.

Figs. 19 and 20 show this needle in different operative relations to the towels.

Fig. 21 shows the interior of a casing in perspective with certain parts removed.

Figs. 22 and 23 show parts removed from the casing in perspective as they would appear when rotated about a vertical axis 180 degrees from their normal position within the casing in Fig. 21.

Fig. 24 shows a slide in perspective removed from the casing shown in Fig. 21.

Fig. 25 shows another slide that engages that shown in Fig. 24. The slide of Fig. 25 has been rotated counter-clockwise (looking down) 90 degrees from its position in engagement with the slide of Fig. 24.

Fig. 26 is a perspective view of the needle.

Fig. 27 is a perspective view of a latch hook and associated parts.

Fig. 28 is a perspective view of a towel partly folded.

Fig. 29 shows the same folded completely.

Fig. 30 shows a pallet on which the folded towels may be stacked.

Fig. 31 shows a pile of folded towels stacked on the pallet.

Fig. 32 is a horizontal section through the box containing the coin controlled mechanism showing a plan view of parts of the said mechanism.

The apparatus comprises posts 40 standing on the floor and carrying at their lower part an open box or receptacle 41. At their upper ends the standards 40 carry a box 42 whose bottom wall is 43 and which has a cover 44 connected at one side by a hinge 45. This box 42 has a glass front 136 and the cover 44 has a lock 135. The rod 46 extends up from the bottom wall 43 within the box 42, forward and down, as shown in Figs. 1 and 2, its lower end being connected in the bottom of the receptacle 41 by a joint 47 that permits rocking the rod 46 forward.

Within the upper box 42, resting upon the bottom wall 43, is a pile of clean towels 49, each individual towel being designated 48 in the drawings. Each towel 48 has a gromet 50 in one edge, and all the gromets 50 are strung on a vertical tube 52, that stands up from the bottom 43, being supported by the fixture 51.

A box 128 depends from the lower wall 43 of the box 42. Within this box 128 there is a vertical rod 53 with a winged head 54 at its lower end by which it may be rotated. Within the box 128 the rod 53 carries a ratchet wheel 55 engaged by a spring held dog 56. The upper part of the rod 53 extends up through the tube 52, and its upper extremity has screw threaded engagement at 57 with the end of the rod 46.

Just behind the tube 52 the bottom wall 43 has a slot 58, through which extends a needle 59. This needle 59 is shown in perspective in Fig. 26 and for most of its extent consists of a hollow semi-cylinder. Just above the screw threaded connection 57 the rod 46 is bent back in a goose-neck 69, and the upper end of the needle 59 has a slightly flared head 60 adapted to fit this bend 69. Just below the head 60 the needle 59 carries a spring tongue or dog 61, the space between the head 60 and this tongue 61 being just sufficient to hold a single gromet 50.

Within the box 128 there is a comparatively heavy metal weight 62 with a hole 63 extending vertically therethrough. The rod 53 passes through this hole 63, so that the weight 62 is adapted to slide up and down on the rod 53. The weight 62 carries a spring held catch 64 adapted to engage a notch 65 in the lower end of the needle 59.

The cover 44 for the box 41 has an opening 133 of considerable size surrounding the vertical tube 52. On the under side this hole 133 is bounded by blocks 66 which carry a pair of pivoted shutters 67, the meeting edges being notched at 68 to accommodate the tube 52.

The weight 62 carries a gravity dog 70 having a head 71 adapted, unless otherwise restrained, to engage the notches 95 in the side wall of the box 128. This dog 70 has an arm 72 that may project a little below the bottom face of the weight 62.

There are three principal vertically movable members within the box 128, namely the already mentioned needle 59, an intermediate carriage 73 and a handle carriage 76. The intermediate carriage 73 has a metal ledge 74 notched at 75 to accommodate the rod 53. This ledge 74 comes up under the weight 62; thus raising the carriage 73 also raises said weight 62 and the needle 59 therewith. It will be seen that when the weight 62 rests upon the ledge or foot 74, the said ledge 74 engages the arm 72 of the dog 70, and thus holds the shoulder 71 thereof out of engagement with the notches 95.

The carriage 76 has an arm 77 that projects through the slot 84 in the side wall of the box 128. At its outer end this arm 77 carries a knob or handle 78. The carriage 76 has a slot 79 into which projects a shoulder 80, carried by the intermediate carriage 73. The lower end of the slot 79 is terminated by a ledge 83. The handle carriage 76 also carries a metal plate 81 adapted to slide vertically in the notch 82 on the intermediate carriage 73.

The intermediate carriage 73 carries a pivoted gravity dog 85, which normally hangs in the position shown in Fig. 8. The lower end of this dog 85 has a ledge 86 that lies normally in the notch 89 in the wall of the box 128. The dog 85 has a heavy metal head 87 from which a prong 88 projects downwardly. The head 87 and prong 88 project from the intermediate member 73 into the upper part of the slot 79 in the handle member 76. At this place the slot 79 has coin guide shoulders 134, as shown in Figs. 14 and 15. The dog 85 carries a transverse plate 90, facing toward the slot 79 in the handle member 76.

The handle member 76 has a coin platform 91 normally lying across the slot 79. This coin platform 91 has a hole 93 in alinement with the prong 88, and is hinged at one side as designated 92. On its opposite side the coin platform 91 has flanges 94.

The intermediate carriage 73 carries a pawl 96 and the counter-weight 97. Near the upper part of the box 128, that is near the wall 43, there is a ledge 99 in the partition 129 adapted to be engaged by this pawl 96. When the pawl 96 engages the ledge 99 it holds up the intermediate carriage 73. The handle carriage 76 carries a stud 98 adapted by the descent of said handle carriage 76 to engage the pawl 96 and disengage it from the ledge 99.

The intermediate carriage 73 carries another pawl 100 adapted under certain conditions to engage the notches 106 in the rear wall of the box 128. Normally the pawl 100 is held out of operative position by the leaf-spring 105, fastened to the lower end of the intermediate member 73 and pulling down by means of the connecting wire 103. The wire 103 is attached to the pawl 100 at 104, and it will be seen that the spring 105 holds the pawl 100 to the left or the right (as viewed in Fig. 7) according as the point of attachment 104 is to the left or the right of the pivot point 101. The pawl 100 carries a stud 102 adapted to engage the shoulders 108 and 132 at the top and bottom, respectively, of the travel of the intermediate carriage 73.

Behind and above the top cover 44 there is a member having a coin receiving slot 109, from which a coin passage 110 extends down, branching at its lower end to the right and the left, as 112 and 113, respectively. Normally a gate 111 closes the left hand passage 113, which leads to an outside tray 114. The normally open branch 112 has its lower end just above the coin platform 91. The coin in various positions is designated 115 in the drawings.

The wall of the box 128 is notched at 116 where it is adjacent to the coin platform 91 near the upper part of the travel of the handle member 76. Below the notch 116 is a removable receptacle 117, standing on the ledge 118. This receptacle 117 has one side cut away at the upper part, as designated 119, to provide an opening to the notch 116.

At the bottom of the box 128 is a pivoted lever 120 normally held by a spring. The end of this lever lies in the path of the weight 62, so that when said weight 62 is in its lowermost position, it is adapted to depress said lever 120. The gate 111 is controlled by a crank arm 121, connected by a link 122 to the said lever 120.

The box 128 has a front door 123 hinged at one side. This door carries a hook 124 on its inner face, and within the box 128 is a pivoted hook latch 125, adapted when the door 123 is closed to engage the door hook 124. The latch hook 125 is held in engagement by a spring, but a rod 126 extends therefrom up through the bottom wall 43, and ends in a push button 127, just beneath the top cover 44, so that a downward push on the button 127 will disengage the latch hook 125.

For piling the towels to introduce them into the box 42, I provide a pallet 130 with a standard 131 on which the gromets 50 may be placed.

In describing the operation of the apparatus I will first assume that the parts are all in normal relation in readiness for a person to make use of an individual towel, the door 123 being latched shut and the top cover 44 being locked at 135. The user of the apparatus drops the proper coin in the slot 109, which falls down on the coin platform 91, taking the position shown at 115 in Fig. 8. The operator then seizes the handle 78, and raises the handle carriage 76, which carries the coin platform 91. This raises the coin 115 against the prong 88 and swings the dog 85 to the position shown in Fig. 9, thus disengaging the ledge 86 from the notch 89. This disengagement of the ledge 86 from the notch 89 releases or unlocks the intermediate carriage 73 and permits the ledge 83 carried by the handle carriage 76 to engage the projection 80 carried by the intermediate carriage 73, and accordingly the raising of the handle carriage 76 raises the intermediate carriage 73.

The normal height of the weight 62 will vary according to the depth of the towel pile 49. At some point in the upward travel of the carriage 73 its foot 74 will engage the weight 62 and raise said weight 62 and the needle 59 therewith. The engagement of the foot 74 with the weight 62 will raise the arm 72 of the dog 70 and hold the shoulder 71 thereof in a position to pass the notches 95. The spring shoulder 61 at the top of the needle 59 will normally be in engagement with the gromet 50 of the top towel 48, as shown in Fig. 18, and accordingly the raising of the needle 59 will carry the top towel 48 with it as indicated in Fig. 19. This will carry the edge of the towel 48 up through the opening 133 in the cover 44, where the operator can seize it with his free hand. By pushing the gromet 50 back over the goose-neck 69, the operator can disengage the said gromet 50 from the head 60 of the needle 59 and pull the top towel 48 along the rod 46 to the front part thereof where he can conveniently use it; then he drops the towel 48 and it descends into the bottom receptacle 41.

The doors or shutters 67 prevent reaching down through the opening 133 and fishing the towels out. They also engage a towel when it is part way out and hold it from falling back in case the operator does not seize it and draw it out.

The operator is obliged to carry the handle 78 up as far as it will go before he can get the towel 48, because the gromet 50 will only disengage from the head 60 of the needle 59 by bringing the said head 60 up close to the goose-neck 69; accordingly the parts must be carried high enough so that the dog 96 will engage the ledge 99 and the stud 102 will strike the abutment 108. The effect of the stud 102 striking the abutment 108 is to throw the dog 100 over so that on its descent it will engage the notches 106, and prevent the carriage 73 from being completely raised again until it has first been completely lowered, which will cause the stud 102 to strike the abutment 132, and thereby throw the dog 100 over to the normal position shown in Fig. 7.

The engagement of the dog 96 with the ledge 99 holds the intermediate carriage 73 up while the handle carriage 76 descends a certain distance. This descent of the handle carriage 76 causes the now inclined face plate 90 of the dog 85 to tilt the coin 115 off the pivoted coin platform 91 into the notch 116, as shown in Fig. 15; accordingly the coin 115 drops into the receptacle 117. Thereafter the stud 98 on the handle member 76 strikes the dog 96 as shown in Fig. 13, disengages it from the ledge 99 and permits the intermediate member 73 to drop.

The needle 59 descends until the spring tongue 61 locks into the gromet 50 of the top towel 48. Thereafter, the intermediate carriage 73 continues its descent until it rests upon the ledge 137. Then the handle member 76 descends further to its lowermost position.

If a person should attempt to get extra towels out of the machine on a single coin by tying a string to the needle 59 and working it up and down he would be prevented by the shoulder 71 of the dog 70 catching into the notches 95, because in this case the foot 74 would not hold up the arm 72.

In case the operator attempts to beat the machine by working the handle 78 up and down through a limited range, this will be entirely ineffective, because the doors 67 will engage the first towel raised through them and hold it, and the needle 59, and the weight 62 up. Then if the handle 78 is worked up and down without carrying the needle 59 up to the limit of its travel, nothing whatever will be accomplished. Of course, on this assumption, the coin 115 will remain on the coin platform 91, but the next user of the machine will simply deposit another coin on top of the coin 115 and the device will operate normally thereafter, simply discharging the two coins at once into the receptacle 117.

The alining prong 88 and hole 93 insure that there shall be proper engagement with the coin and also insure against attempts to work the machine by means of common annular washers instead of proper coins.

When the towels are all gone this fact can readily be noticed through the glass front 136 of the box 42. Also, when this happens the needle 59 will descend so far to its normal position that the weight 62 will strike the lever 120 and thereby shift the gate 111 so as to throw any coins inserted at 109 out into the tray 114 where they can be readily recovered.

The screw joint 57 can only be disengaged by holding back the pawl 56 from the ratchet 55, hence only when the door 123 is open.

When the towels 49 in the box 42 are to be replenished they are stacked up on the pallet 130, as shown in Fig. 31, and thus they are formed into a bundle with alining gromets that can be removed from the pallet. The screw joint 57 being disengaged and the rod 46 swung forward, the needle 59 is unlatched at its lower end from the weight 62 and pulled up and out. Then the needle 59 is pushed down into the gromets 50 of all the towels 48 in the bundle of towels. The cover 44 being opened back all the gromets 50, guided by the needle 59, are slipped down around the tube 52; the weight 62 is then attached to the lower end of the needle 52, the cover 44 closed down, and the screw joint 57 connected by rotating the winged head 54.

The door 123 can be locked shut whether the cover 44 is open or closed, because the latch members 124 and 125 snap together, but it can only be opened after unlocking and opening the cover 44, which gives access to push down on the button 127.

It will be seen that I have provided apparatus which will dispense single towels to individual users upon the payment of the proper coin in the slot, but after the towels are used they still remain connected to the apparatus and cannot be taken away by the user.

I claim:

1. In a coin-controlled device, a chamber, a delivery member mounted therein, an actuating member adapted to operate said delivery member, a handle member, coin-actuated means to control the actuation of the actuating member by said handle member, and means to prevent the actuation of said delivery member except by said actuating member, said last-named means being released by the operative engagement of said actuating member with the delivery member.

2. In a coin controlled device, a delivery member, a carriage member, means carried by said carriage member to operate said delivery member, means acting normally to prevent operation of said delivery member, said first named means being arranged to release said second named means when said carriage member is operated, and coin controlled means to permit operation of said carriage member.

3. In a coin-controlled device, a chamber, a delivery member mounted therein, an intermediate member adapted to operate said delivery member, a handle member, means to permit actuation of said intermediate member by the handle member, and means acting normally to retain said intermediate member in inoperative position relative to said chamber, said means being arranged to release the intermediate member upon being actuated by a coin.

4. In a device of the class described, a delivery member, an intermediate member, means by which said intermediate member operatively engages said delivery member, coin controlled means for permitting movement of said intermediate member from normal position to extreme position, and means to prevent said intermediate member from being again moved to said extreme position until it has been returned to normal position.

5. In a device of the class described, a delivery member, an intermediate member adapted to operate said delivery member, a handle member, coin actuated means for permitting operation of said intermediate member by said handle member, means to support the coin during said operation, a coin receptacle, and means to discharge the coin from said support into said receptacle.

6. In a device of the class described, a delivery member, an intermediate member adapted to operate said delivery member, a handle member, coin controlled means to enable said handle member to be used for moving said intermediate member from normal position to extreme position, means to support said coin on one of said members during said movement, means to retain said intermediate member in said extreme position, a coin receptacle, means actuated by said coin controlled means to discharge said coin into said receptacle, and means to release said retaining means.

7. In a device of the class described, a movable member, an operating member for said movable member, means operatively connected to said movable member and acting normally to prevent movement thereof, and means carried by said operating member and adapted to support a coin in position to release said first-named means upon movement of the operating member.

8. In a device of the class described, a chamber, a delivery member, an intermediate member adapted to operate said delivery member, a handle member adapted to operate said intermediate member, coin actuated means to control said last named operation, a coin slot through which a coin is inserted, said chamber having a coin passage leading from said coin slot to said coin actuated means, and means to divert a coin from said coin actuated means when there is no material present upon which said delivery member may operate.

9. In a device of the class described, a chamber, a delivery member, an intermediate member adapted to operatively engage said delivery member, a pivoted dog carried by said intermediate member and acting normally to engage a notch in the wall of said chamber to prevent movement of said intermediate member, a handle member, a coin platform carried by said handle member in position whereby a coin placed thereon will engage said pivoted dog upon movement of said handle member and thereby release said intermediate member.

10. In a device of the class described, a chamber, a delivery member, an intermediate member adapted to operatively engage said delivery member, a pivoted dog carried by said intermediate member and acting normally to engage a notch in the wall of said chamber to prevent movement of said intermediate member, a handle member adapted to operate said intermediate member, a coin platform to support a coin in position to release said pivoted dog and permit movement of said handle member and said intermediate member from normal position to extreme position, said coin platform being adapted to retain said coin during said movement, a pawl adapted to engage a notch in the wall of said chamber and retain said intermediate member in said extreme position, and a plate carried by said pivoted dog and adapted to coact with said coin platform, whereby said coin is discharged from said platform upon movement of said handle member toward normal position.

11. In a device of the class described, a chamber, a delivery member, an intermediate member adapted to operatively engage said delivery member, a pivoted dog carried by said intermediate member and acting normally to engage a notch in the wall of said chamber to prevent movement of said intermediate member, a handle member adapted to operate said intermediate member, a coin platform to support a coin in position to release said pivoted dog and permit movement of said handle member and said intermediate member from normal position to extreme position, said coin platform being adapted to retain said coin during said movement, a pawl adapted to engage a notch in the wall of said chamber and retain said intermediate member in said extreme position, a plate carried by said pivoted dog and adapted to coact with said coin platform, whereby said coin is discharged from said platform upon movement of said handle member toward normal position, and a lug carried by said handle member and adapted to release said pawl from engagement with said notch upon further movement of said handle lever toward normal position.

12. In a device of the class described, a chamber, a movable member, an operating member, a member carried by said movable member and acting normally to engage a notch in the wall of said chamber to prevent movement of said movable member, means carried by said operating member to support a coin in a position to release said last-named member from the notch to permit operation of said movable member, and means to discharge said coin from said supporting means after a predetermined movement of said operating member.

In testimony whereof, I have subscribed my name.

ROBERT S. CORLETT.

Witnesses:
CARL A. RICHMOND,
HENRY A. PARKS.